April 28, 1964

J. BRUSSELL 3,131,280

HEATING OVEN FOR FOODS

Filed Nov. 2, 1961

INVENTOR.
JACOB BRUSSELL

BY

ATTORNEYS

April 28, 1964  J. BRUSSELL  3,131,280
HEATING OVEN FOR FOODS
Filed Nov. 2, 1961  2 Sheets-Sheet 2
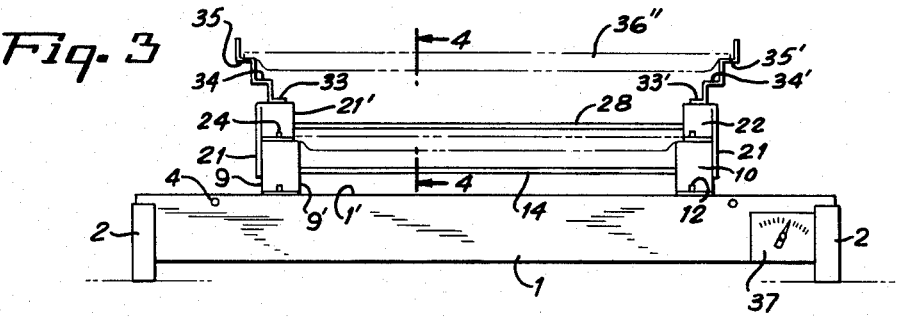
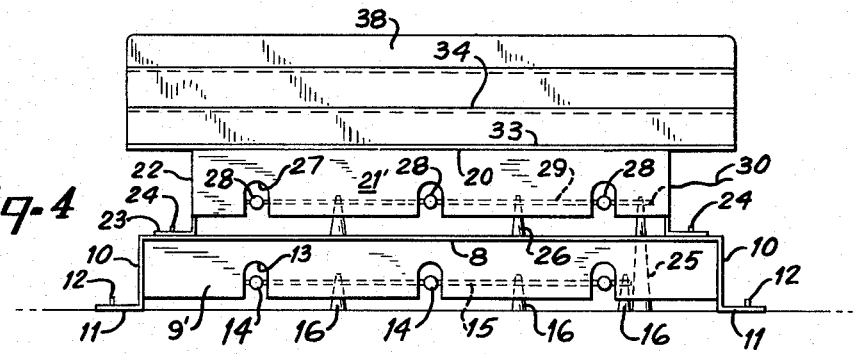
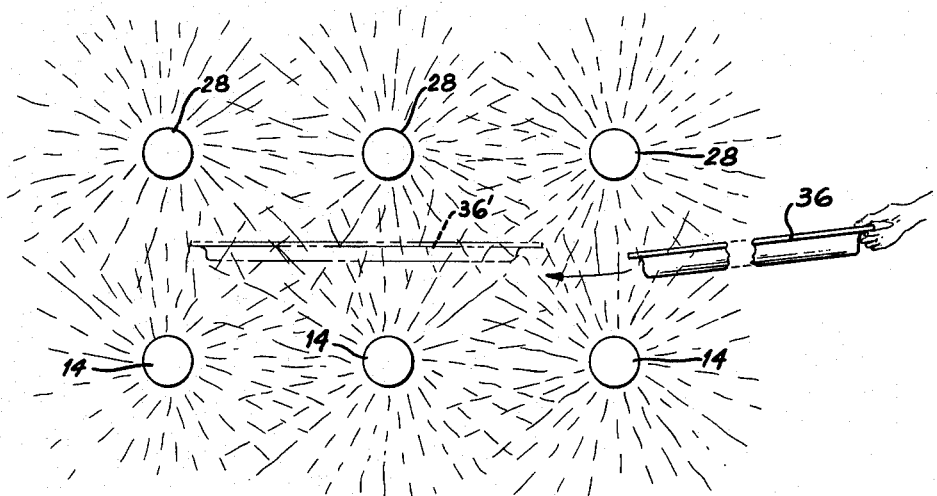
INVENTOR.
JACOB BRUSSELL
BY
ATTORNEYS

United States Patent Office 3,131,280
Patented Apr. 28, 1964

3,131,280
HEATING OVEN FOR FOODS
Jacob Brussell, 226 W. 24th St., Hialeah, Fla.
Filed Nov. 2, 1961, Ser. No. 149,672
11 Claims. (Cl. 219—35)

The present invention is directed to heating ovens for foods, and more particularly to an apparatus for heating frozen foods to the desired temperature for consumption.

Frozen foods, such as packaged and cooked dinners usually on trays, require reheating to bring them to the proper temperature for serving. Various heating arrangements have been used, most of them being the ordinary kitchen ranges, either electrically heated or gas heated; such ovens are difficult to control for the proper heating and they have too slow a heating cycle. Other ovens designed for faster heating also have disadvantages in that only a single item can be heated at one time, and the construction was such as to introduce difficulties when cleaning was necessary because of splattering of food or accidentally dropping food into the oven. Where electric heating was used, it was difficult to gain access thereto for the purpose of replacing burnt-out elements or to clean them.

The present invention is intended and adapted to overcome the disadvantages and difficulties inherent in ovens of the prior art, it being among the objects of the invention to provide a heating oven which is compact, simple in structure, and readily accessible.

It is also among the objects of the invention to provide an oven which is capable of simultaneously heating a plurality of food items to the desired temperature and at a rapid rate.

It is further among the objects of the invention to provide an oven which can be readily disassembled to permit access to all essential elements thereof for the purpose of cleaning, repairing or replacing such elements.

In practicing the invention, a pair of spaced elongated frames of inverted channel form have supports within the channel across which are held a plurality of heating tubes. The depending sides of the frames protect the user from touching any exposed electricity carrying elements. The tops of the frames constitute shelves across which food trays to be heated are supported. The ends of the frames have flanges which rest on the base; upstanding pins on the base pass through openings in the flanges preventing lateral movement but permitting ready lifting of the frames from the base for access to the heating tubes which supply radiation in the infra red range. On top of the frames is mounted a similar pair of frames, supports and tubes so that heating of the food is from above and below if desired.

The invention is more fully described in connection with the accompanying drawings in which like reference characters indicate like parts, and in which FIG. 1 is a perspective view of one form of the invention showing the general character thereof;

FIG. 3 is a front elevational view thereof with the casing removed and showing food trays in position for reheating;

FIG. 4 is a somewhat enlarged vertical cross-sectional view taken along line 4—4 of FIG. 3 and showing some details of the mounting of the supports and tubes;

FIG. 5 is an enlarged diagrammatic view illustrating the heating effect of the oven.

Figure 1:
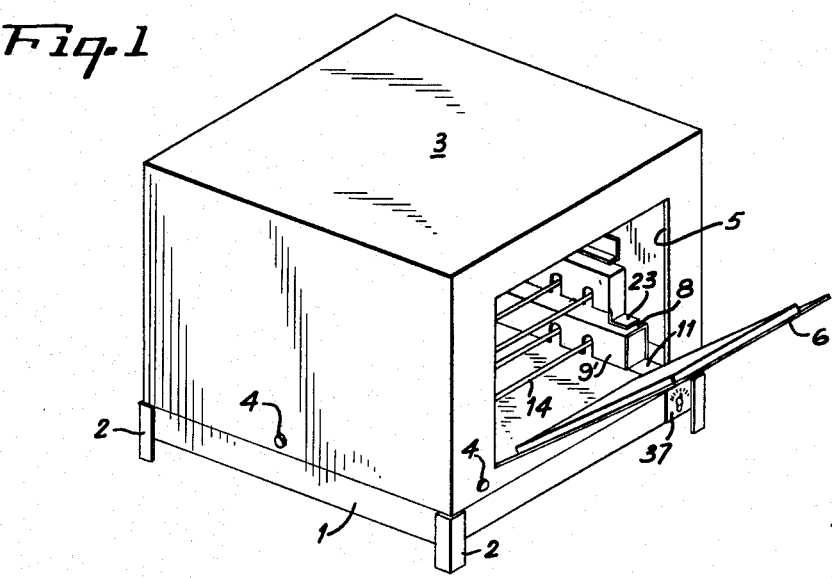
Figure 6:
FIG. 6 is a perspective view of means for removably connecting and holding the casing onto the base.
Figure 2:
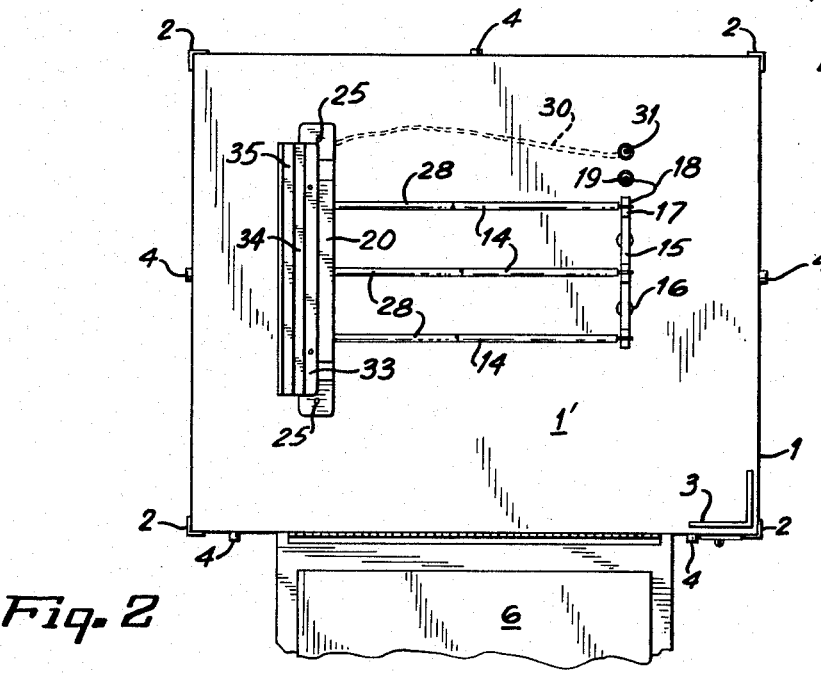
FIG. 2 is a top plan view thereof with the casing removed and some parts omitted or broken away for clearness.

The oven consists essentially of a base 1 having a top face 1' on which a tray to be heated may be placed. Usually it has legs 2 at the corners thereof. Casing 3 fits within the upstanding rim of base 1 and is held by a plurality of pins 4 passing through registered holes in the rim and casing. As shown in FIG. 6 the pins have a pair of legs with bowed spring portions 4' to snap into the inner face of the casing and provide for ready removal of the pins, and lifting off of the casing. A front opening 5 is closed by door 6 hinged at its bottom edge.

A pair of inverted channel frames have upper faces 8 constituting shelves, outer depending sides 9 and inner depending sides 9'. They have ends 10 from which horizontal flanges 11 extend. Pins 12 on face 1' pass through openings in said flanges. Cutout areas 13 in sides 9' provide openings through which infra red tubes 14 pass transversely of the frames. Supports 15 in the frames are held in insulators 16 on face 1'. The ends of tubes 14 fit removably into clips 17 on the top of the supports. Connecting wire 18 from one of the supports terminates in one pole 19 of a receptacle for a source of current.

There is also provided a pair of inverted channel upper frames having upper faces 20, outer depending sides 21 and inner depending sides 21'. Sides 21 extend downward to cover at least in part sides 9. Ends 22 have horizontal flanges 23. Pins 24 extending upward from shelf 8 pass through openings in the flanges. Insulators 25 on face 1' act as mounts for the ends of upper supports 29, and additional insulators 26 may be mounted at intermediate points. Cutout areas 27 on sides 21' provide openings through which infra red tubes 28 pass to be held by clips (not shown) on supports 29 in the same manner as tubes 14 are held on supports 15. A wire 30 from one of supports 29 terminates in the other pole 31 of the source of current.

A pair of stepped plates are provided on the upper frames as shown in FIGS. 3 and 4. The first step 33 of one plate is secured to face 20 and constitutes, with its opposite step 33' of the other plate forming a shelf between which a tray may be held. For wider trays steps 34—34' and steps 35—35' provide shelves. Thereby various sizes of food trays may be either simultaneously or separately heated in the new oven structure.

FIG. 5 illustrates the manner in which a tray 36 may be slipped between two sets of heating tubes to be heated very quickly from above and below simultaneously. A tray 36" (FIG. 3) placed above tubes 28 will be heated not only from below but also some rays will be reflected onto the upper face thereof from the inner surfaces of casing 3. A timer 37 is placed in the electric circuit, whereby the desired temperature for each type of food package may be accurately gauged.

I claim:

1. Heating oven for foods comprising a base, a pair of elongated spaced substantially parallel hollow frames mounted on said base, an elongated support within each frame, a plurality of heating tubes spaced apart and held in said supports, upstanding insulator posts on said base and holding the supports elevated above the base and having the upper ends thereof secured to said supports, a casing on said base enclosing said frames and having an access opening to the space between said frames, the top of said frames forming flat tray supports and constituting a pair of shelves for supporting a tray.

2. Heating oven according to claim 1 characterized in that said frames have depending sides enclosing said supports and cutout areas through which said tubes extend.

3. Heating oven according to claim 1 characterized in that the ends of said frames have flanges and means passing through said flanges for attachment to said frame, said means including pins and openings in said flanges and base permitting lifting of said frames from said base.

4. Heating oven according to claim 1 characterized in that a pair of stepped plates are secured to said frames, the steps of said plates diverging and forming a plurality of shelves to either simultaneously or separately accommodate trays of different widths.

5. Heating oven according to claim 1 characterized in that a pair of upper frames are mounted on said first frames, an upper support in each of said upper frames, heating tubes mounted between said upper supports, upstanding insulator posts on said base and having the upper ends thereof secured to said upper supports.

6. Heating oven according to claim 5 characterized in that said upper frames have depending sides enclosing said upper supports.

7. Heating oven according to claim 5 characterized in that said ends of said upper frames having upper flanges, means including pins and openings in said upper flanges and said first frames permitting lifting said upper frames from said first frames.

8. Heating oven according to claim 5 characterized in that said upper frames have depending sides enclosing said upper supports, said sides embracing the outer faces of said first frames.

9. A heating oven comprising, a base, a number of groups of insulating posts extending vertically upward from the base, a tube support extending between the insulating posts in each group, clips mounted on said supports, infra-red heating tubes supported at their ends in said clips, channel frames arranged over and enclosing the supports and the clips thereon and also extending over the ends of the infra-red tubes, said channel frames having flat upper surfaces constituting shelf supports for the rim of a tray adapted to have its contents heated by the infra-red tubes.

10. A heating oven as provided for in claim 9, wherein a number of the channel frames are mounted one above the other, with a group of the tubes arranged between the lower channel frames, and a second group of the tubes arranged between the upper channel frames, with the groups of tubes being vertically spaced apart to permit a tray to be rested on the top of the lower channel frames while being located between the groups of infra-red tubes.

11. A heating oven comprising, a base, upper and lower banks of heating tubes mounted above the base, said banks of tubes being arranged in vertically-spaced relation and defining a space between them to accommodate a tray having contents to be heated by heat directed from above and below by means of the tubes, means on the base and at the opposite ends of the tubes for supporting the tubes, lower channelled enclosures at the opposite ends of the lower bank of tubes for covering said ends of the tubes, said lower enclosures having a flat upper surface located intermediate of the banks of tubes to thereby receive and support a tray between the banks of tubes, a pair of upper channelled enclosures mounted on and extending upwardly from the lower enclosures and covering the ends of the upper bank of tubes, said upper enclosures having an upper tray-supporting surface for holding a tray above the upper bank of tubes, and stepped plates secured at the top of the upper enclosures and providing a plurality of shelves for supporting differently-sized trays either simultaneously or separately above the upper bank of tubes.

References Cited in the file of this patent

UNITED STATES PATENTS

| | | |
|---|---|---|
| 2,107,381 | Leppke | Feb. 8, 1938 |
| 2,303,098 | Waldo | Nov. 24, 1942 |
| 2,957,973 | Torrez | Oct. 25, 1960 |
| 2,995,257 | D'anka | Aug. 8, 1961 |
| 3,037,443 | Newkirk et al. | June 5, 1962 |